United States Patent
Shiitani et al.

(10) Patent No.: US 8,233,193 B2
(45) Date of Patent: Jul. 31, 2012

(54) DOCUMENT EDITING TO PREVENT LEAKING SECRET INFORMATION BY MASKING AN AREA INCLUDING HIERARCHICALLY ARRANGED OBJECTS

(75) Inventors: Shuichi Shiitani, Kawasaki (JP); Takayuki Baba, Kawasaki (JP); Susumu Endo, Kawasaki (JP); Daiki Masumoto, Kawasaki (JP); Shigemi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 666 days.

(21) Appl. No.: 12/414,594

(22) Filed: Mar. 30, 2009

(65) Prior Publication Data
US 2009/0244640 A1    Oct. 1, 2009

(30) Foreign Application Priority Data
Mar. 31, 2008    (JP) .................. 2008-092972

(51) Int. Cl.
*H04N 1/38* (2006.01)
*H04N 1/387* (2006.01)
*H04N 1/44* (2006.01)
*G06F 17/00* (2006.01)

(52) U.S. Cl. ....... 358/2.1; 358/3.28; 358/1.18; 358/452; 358/453; 358/462; 715/243; 715/255

(58) Field of Classification Search .................. 358/1.9, 358/2.1, 3.28, 1.18, 537, 538, 470, 452–462; 382/173, 176–178, 190, 195, 282, 291, 292; 715/200, 201, 209, 234, 243, 246, 255, 256
See application file for complete search history.

(56) References Cited

FOREIGN PATENT DOCUMENTS
JP    3-209577 A    9/1991

*Primary Examiner* — Scott A Rogers
(74) *Attorney, Agent, or Firm* — Fujitsu Patent Center

(57) ABSTRACT

A computer-readable recording medium that stores a program for causing a computer to edit an electronic document including a plurality of hierarchically arranged objects. The program makes a computer execute extracting an object from the electronic document including the hierarchically arranged objects representing one of a text, an image, a drawing and a table; determining whether the extracted object is superimposed by a user specified area serving as a masking area of a target document input by a user; and converting, into different information, information included in an area of the object determined to be superimposed by the user specified area.

19 Claims, 6 Drawing Sheets

FIG. 3

| PAGE NUMBER | PAGE SIZE | NUMBER OF ELEMENTS | ELEMENT ID | POSITION | SIZE | ORDER | SHAPE | BACKGROUND COLOR | IMAGE INFORMATION | TEXT INFORMATION |
|---|---|---|---|---|---|---|---|---|---|---|
| 1 | (19.0, 25.0) | 6 | 001 | (12.5, 20.0) | (1.5, 1.5) | 1 | RECTANGULAR | WHITE | IMAGE DATA 1 | — |
| | | | 002 | (10.0, 20.0) | (1.5, 1.5) | 2 | RECTANGULAR | WHITE | IMAGE DATA 2 | — |
| | | | 003 | (7.5, 19.5) | (9.0, 3.0) | 3 | ELLIPTICAL | BLUE | — | — |
| | | | 004 | (3.0, 17.0) | (3.0, 3.0) | 4 | RECTANGULAR | WHITE | IMAGE DATA 3 | — |
| | | | 005 | (1.5, 16.0) | (16.0, 7.5) | 5 | RECTANGULAR | YELLOW | — | — |
| | | | 006 | (0.0, 0.0) | (19.0, 25.0) | 6 | RECTANGULAR | WHITE | — | TEXT DATA 1 |
| 2 | (19.0, 25.0) | 4 | 007 | (12.5, 20.0) | (1.5, 1.5) | 1 | RECTANGULAR | WHITE | IMAGE DATA 4 | — |
| | | | 008 | (10.0, 20.0) | (1.5, 1.5) | 2 | RECTANGULAR | WHITE | IMAGE DATA 5 | — |
| | | | 009 | (7.5, 19.5) | (9.0, 3.0) | 3 | ELLIPTICAL | BLUE | — | — |
| | | | 010 | (0.0, 0.0) | (19.0, 25.0) | 6 | RECTANGULAR | WHITE | — | TEXT DATA 2 |
| ... | | | | | | | | | | |

DOCUMENT EDITING TO PREVENT LEAKING SECRET INFORMATION BY MASKING AN AREA INCLUDING HIERARCHICALLY ARRANGED OBJECTS

CROSS-REFERENCE TO RELATED APPLICATIONS

This application is based upon and claims the benefits of priority of the Japanese Patent Application No. 2008-92972, filed on Mar. 31, 2008, the entire contents of which are incorporated herein by reference.

FIELD

The present invention relates to a document editing program for preventing secret information from being leaked by masking an area of the secret information in a document of electronic data including hierarchically arranged objects such as a text, an image, a drawing, and a table. The present invention also relates to a recording medium storing the document editing program, and a method and apparatus for editing documents.

BACKGROUND

A document is typically edited on a computer and then distributed in the form of electronic data. In the case of a hardcopy document, a portion including secret information such as private information may be blackened out to prevent the secret information from being leaked.

An electronic data document may be typically distributed in a data format that does not permit the document to be edited, with a secret information portion thereof masked. The leakage of secret information is thus controlled. Also to prevent information leakage, an electronic data document may be distributed with the masked secret information portion password-locked in an uneditable state.

However, the distribution of a document in an uneditable data format presents a disadvantage that a user having received the document cannot reuse the document even if the portion of the information the user wishes to use is a non-secret portion of the document.

The distribution of a document in an uneditable data format in a password-locked state presents another disadvantage that, although the document can be reused by unlocking the password, only a limited number of users who know the password can edit the document.

Japanese Patent Laid-Open No. 3-209577 discloses a technique in which a secret information portion of an electronic data document is converted into information different from the original information in order to prevent the secret information from being leaked in the course of distribution of the document.

SUMMARY

According to an aspect of the invention, a computer-readable recording medium stores a program for causing a computer to edit an electronic document including a plurality of hierarchically arranged objects. The program causes a computer to extract an object from the electronic document including the hierarchically arranged objects representing one of a text, an image, a drawing and a table; determine whether the extracted object is superimposed by a user specified area serving as a masking area of a target document input by a user; and convert, into different information, information included in an area of the object determined to be superimposed by the user specified area.

It is to be understood that both the foregoing general description and the following detailed description are exemplary and explanatory only and are not restrictive of the invention, as claimed.

BRIEF DESCRIPTION OF THE DRAWINGS

FIG. 3 depicts an object property management table of a document file according to an example of a first embodiment of the present invention;

DESCRIPTION OF THE PREFERRED EMBODIMENTS

In accordance with technique disclosed previously, the electronic data document is based on the assumption that all the information including images and tables are represented by characters or character strings. The current electronic data document is created by combining elements called "objects". Each object may include a variety of information such as characters, character strings, illustrations, marks, and symbols.

Since such an object is a completely different type of data from characters, the known technique of converting the character or the character string into different information cannot mask the secret information of the object.

Since objects can be freely organized by superimposing one on another, secret information included in one object may happen to be superimposed on and thus hiding another object, and a document editor may fail to mask all the desired objects.

In accordance with embodiments of the present invention, as described in detail below, a document editing apparatus, a document editing method, and a recording medium storing a document editing program reliably mask without omission a secret information portion of an electronic data document created by combining text and objects, and assure both reusability and information secrecy of the masked electronic data document.

In accordance with embodiments of the present invention, the secret information is masked with editability of the document maintained. Since it is sufficient to specify a masking area covering a secret information portion of the document, the number of processes is substantially reduced.

The embodiments of the present invention are described with reference to the accompanying drawings. The document editing apparatus, the document editing method, and the recording medium storing the document editing program in accordance with embodiments of the present invention are based on the premise that an application software installed on the document editing apparatus is executed by a computer.

The present invention is not limited to the above arrangement. The document editing program stored on the recording medium may be read into the computer, and the computer may then execute a document editing process.

The term "document" in the context of this specification means an electronic document created on a computer. In the discussion that follows, the term "element" and the term "object" are interchangeable.

Figure 1:
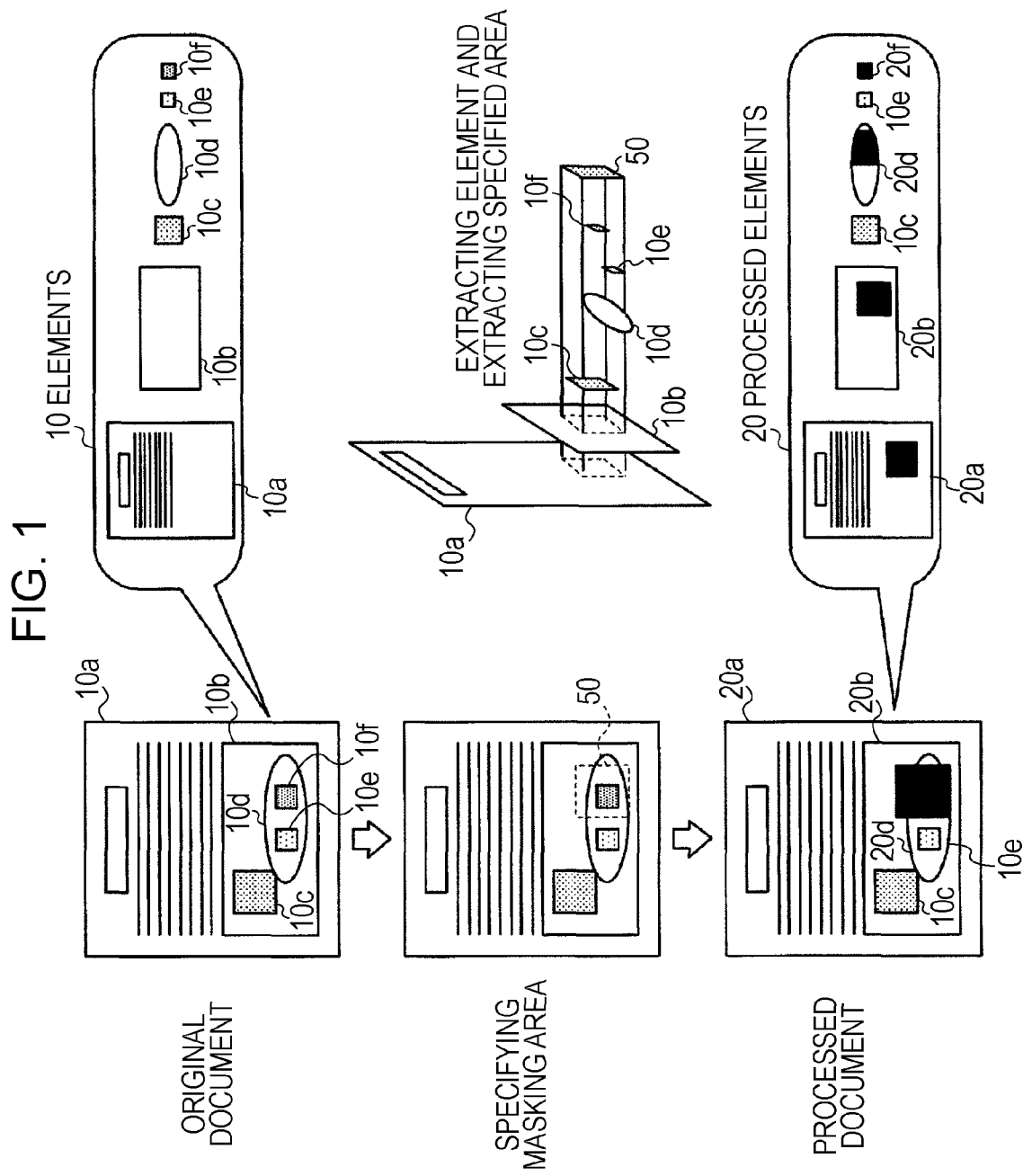
FIG. 1 depicts a document masking process according to an example of a first embodiment of the present invention.

Referring to FIGS. 1 through 4, a first embodiment of the present invention is described below. A document masking process of the first embodiment of the present invention is summarized first. FIG. 1 illustrates the document masking process of the first embodiment of the present invention.

Referring to FIG. 1, an "original document" includes an element group 10 as an object in which an element is superimposed on another element. The elements in the element group 10 of the original document include characters, character strings, a drawing, a table, an illustration, a mark, a symbol, and the like. The elements themselves may be characters, character strings, a drawing, a table, an illustration, a mark, and a symbol.

As illustrated in FIG. 1, the element group 10 includes elements 10a-10f. The elements 10a-10f are extracted from the original document including secret information. These extracted elements are superimposed starting from the bottommost layer with the element 10a, the element 10b, the element 10c, the element 10d, the element 10e, and the element 10f in that order.

A masking process is then performed on an area superimposed by a masking area 50 the user specifies to keep secret. The masking process is performed on an area of each element superimposed by the masking area 50, starting from the topmost layer.

Partially or entirely superimposed by the masking area 50 are the element 10f, the element 10d, the element 10b, and the element 10a. The masking process is performed on the top side of the superimposition area of each of these elements with the masking area 50.

The masking process is performed by converting the original information into different information, e.g., by converting a character into a different character, or blackening out a drawing, a table, an illustration, a mark, or a symbol. The masking process is performed on the top sides of all the elements partially or entirely superimposed by the masking area 50.

The element 10a, the element 10b, the element 10d, and the element 10f having undergone the masking process thus become an element 20a, an element 20b, an element 20d, and an element 20f. The element 20a, the element 20b, the element 10c, the element 20d, the element 10e, and the element 20f are referred to as a "processed element group 20".

After performing the masking process on the top sides of all the elements partially or entirely superimposed by the masking area 50, the processed element group 20 is then arranged at the same locations as the original document to produce a processed document.

If the original document includes the secret information with this arrangement, the secrecy of the secret information is maintained when distributing the processed document. All the elements partially or entirely superimposed by the masking area 50 are thus masked. Even if a user having received the processed document changes the layout of the processed element group 20 in an editing process, the secrecy of the secret information is still be maintained.

Figure 2:
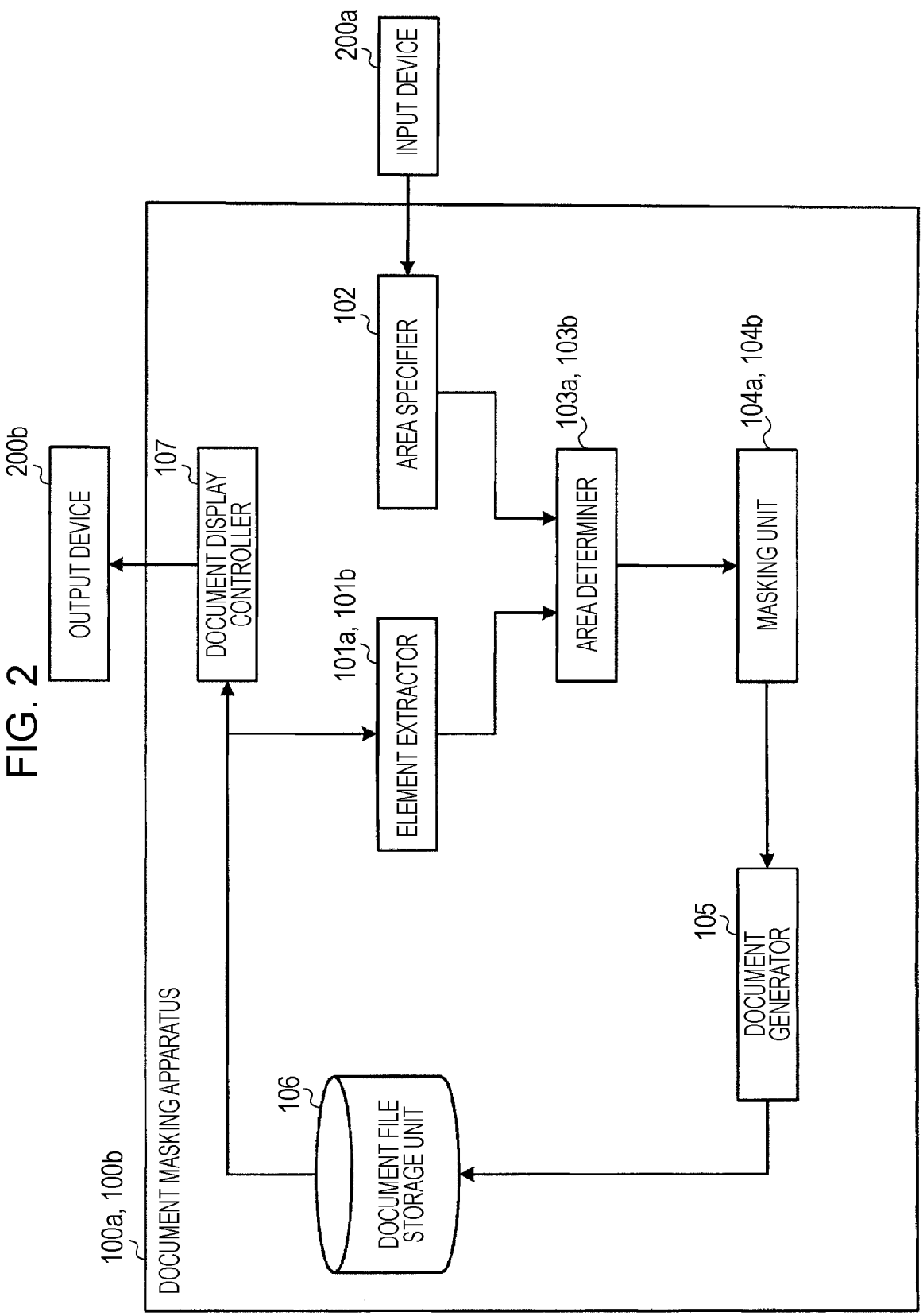
FIG. 2 depicts a document masking apparatus according to an example of a first embodiment of the present invention.

A structure of the document masking apparatus 100a in accordance with the first embodiment of the present invention is described below. FIG. 2 is a functional block diagram of the document masking process 100a in accordance with the first embodiment of the present invention. Referring to FIG. 1, the document masking apparatus 100a includes an element extractor 101a, an area specifier 102, an area determiner 103a, a masking unit 104a, a document generator 105, a document file storage unit 106, and a document display controller 107.

The original document including hierarchically arranged objects is read from the document file storage unit 106 and displayed on a display screen of an output device 200b by the document display controller 107.

The area specifier 102 receives a designation of a masking area input by an input device 200a (such as a keyboard or a mouse) by the user. The area determiner 103a determines an area of each object extracted by the element extractor 101a superimposed by the masking area input by the user.

The masking unit 104a performs the masking process on the top side of the area of each object determined to be superimposed by the masking area by the area specifier 102. In the masking process, a character may be converted into a different character, and a drawing, a table, an illustration, a mark or a symbol may be color-filled with the lowest gradation of a respective color to indicate distinctly that the drawing, table, illustration, mark, or symbol is mask processed. The original information is thus converted into different information so that the original information is illegible.

The document generator 105 produces a processed document by re-arranging an object masked by the masking unit 104a and an object not masked by the masking unit 104a with the layout of the original document maintained. The document generator 105 attaches a new file name to the processed document different from the file name of the original document, and then stores the file in the document file storage unit 106.

An object property of such a document file in accordance with the first embodiment of the present invention is described below. FIG. 3 illustrates an object property management table of the document file of the first embodiment of the present invention.

The object property is an attribute of the object included in the document file. The object property management table manages object properties, and is included in the data of the document file. In the discussion that follows, the unit of size is "cm."

In a coordinates system, for example, the origin is at the top-left corner of the page, the X-axis extends horizontally along the page, and the Y-axis extends vertically along the page. A position (x,y) represents a point y [cm] spaced along the Y-axis from the origin, and x [cm] spaced along the X-axis from the origin.

For example, page number "1" has a page size (19.0,25.0) and the number of elements is "6." Each element is identified by a unique element identification (ID)

For example, an element having an element ID of "001" has position coordinates of (12.5, 20.0) and a size of (1.5, 1.5). The order in the object property management table represents the arrangement order of the hierarchical layer of each object within the same page. The smaller the order, the higher hierarchical layer the object is at.

The shape in the object property management table represents a shape of each object. The background color in the object property management table represents a background color of each object. The image information in the object property management table represents image data included in the object and a position and an attribute of the image data.

The text information in the object property management table represents text data included in the object, and a position and an attribute of the text data (font size, font information, color, character decoration, etc.).

Figure 4:
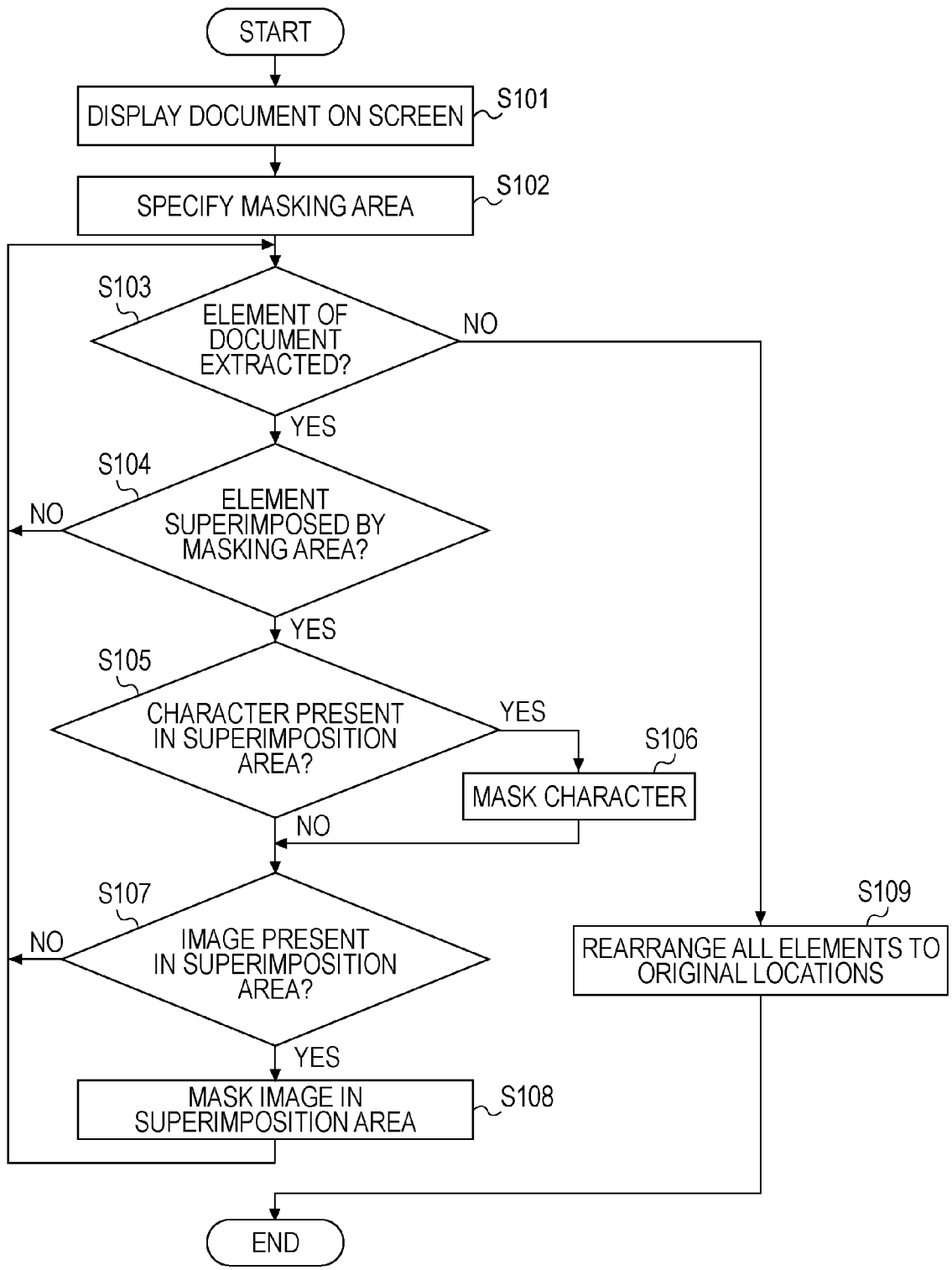
FIG. 4 depicts a flowchart illustrating a document masking process according to an example of a first embodiment of the present invention.

The document masking process performed by the document masking apparatus 100a of the first embodiment of the present invention is discussed below. FIG. 4 is a flowchart illustrating the document masking process in accordance with the first embodiment of the present invention. Referring to FIG. 4, the document display controller 107 reads a document to be mask processed from a document stored in the document file storage unit 106 and displays the read document on a display screen of the output device 200b in S101.

In S102, the area specifier 102 specifies, as the document to be mask processed, the masking area input by the user with the input device 200a. In S103, the element extractor 101a determines whether an element of the document to be mask processed is extracted in accordance with the order illustrated in FIG. 3.

If the element extractor 101a determines that the element of the document to be mask processed is extracted in accordance with the order (YES in S103), processing proceeds to S104. If the element extractor 101a determines that the element of the document to be mask processed is not extracted in accordance with the order (NO in S103), processing proceeds to S109.

In S104, the area determiner 103a determines whether an area of the element extracted in S103 is superimposed by the masking area specified in S102.

If the area determiner 103a determines that the area of the element extracted in S103 is superimposed by the masking area specified in S102 (YES in S104), processing proceeds to S105. If the area determiner 103a determines that the area of the element extracted in S103 is not superimposed by the masking area specified in S102 (NO in S104), processing returns to S103 to acquire a next element.

In S105, the area determiner 103a determines whether a character is included in the area of the element extracted in S103 determined to be superimposed by the masking area specified in S102.

If the area determiner 103a determines in S105 that a character is included in the area of the element extracted in S103 determined to be superimposed by the masking area specified in S102 (YES in S105), processing proceeds to S106. If the area determiner 103a determines in S105 that a character is not included in the area of the element extracted in S103 determined to be superimposed by the masking area specified in S102 (NO in S105), processing proceeds to S107.

In S106, the masking unit 104a converts, into different information (such as a different character, a different symbol, or the like), the character included in the area of the element extracted in S103 determined to be superimposed by the masking area specified in S102. Processing then proceeds to S107.

In S107, the area determiner 103a determines whether an image is included in the area of the element extracted in S103 determined to be superimposed by the masking area specified in S102.

If the area determiner 103a determines that an image is included in the area of the element extracted in S103 determined to be superimposed by the masking area specified in S102 (YES in S107), processing proceeds to S108. If the area determiner 103a determines that an image is not included in the area of the element extracted in S103 determined to be superimposed by the masking area specified in S102 (NO in S107), processing returns to S103.

In S108, the masking unit 104a masks (fills in) the image included in the area of the element determined to be superimposed by the masking area specified in S102, by converting the image into different information (such as a different image). Processing returns to S103.

In S109, the document generator 105 rearranges all the elements in the original locations, and generates the processed document. The document masking process thus ends.

Figure 5:
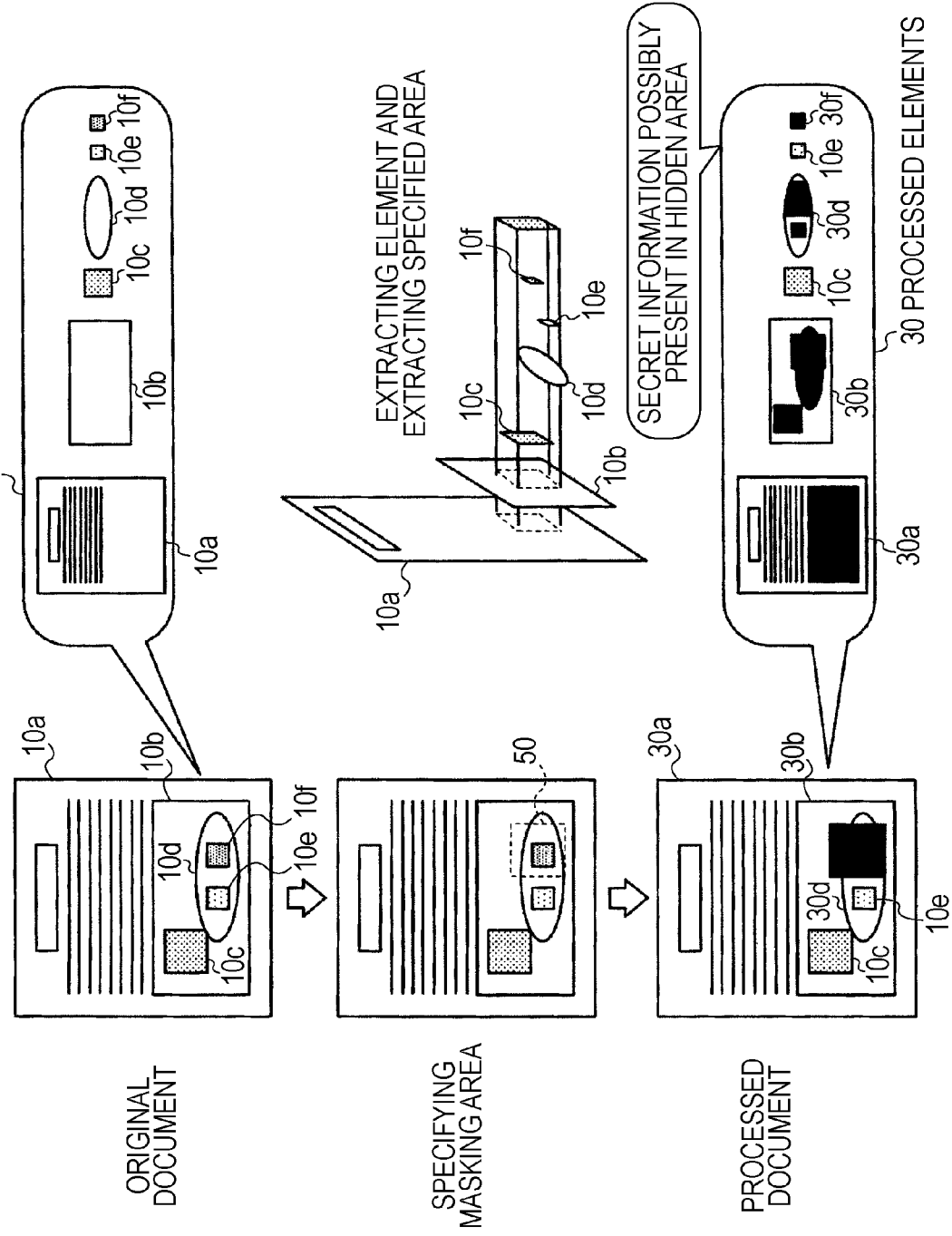
FIG. 5 depicts a document masking process according to an example of a second embodiment of the present invention.
Figure 6:
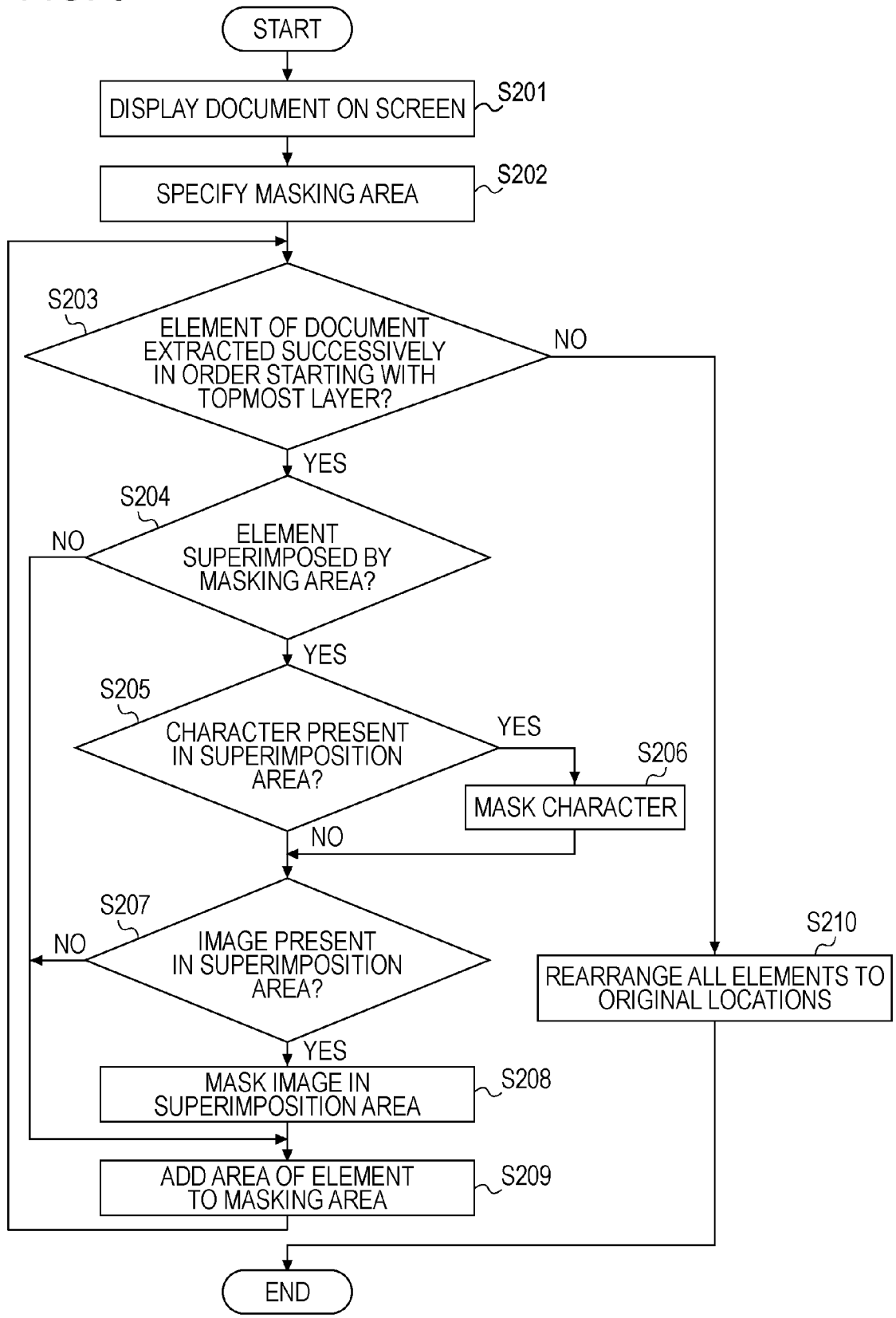
FIG. 6 depicts a flowchart illustrating the document masking process according to an example of a second embodiment of the present invention.

A second embodiment of the present invention is described below with reference to FIGS. 5 and 6. The second embodiment of the present invention is described below focusing on a difference between the first embodiment and the second embodiment of the present invention. The document masking process of the second embodiment of the present invention is summarized first. FIG. 5 illustrates the document masking process of the second embodiment of the present invention.

Referring to FIG. 5, each of the element 10f, the element 10d, the element 10b, and the element 10a has an area partially or entirely superimposed by the masking area 50. The masking process is performed on the top side of each superimposition area with the masking area 50.

The elements 10a-10f are successively extracted from the "original document" including the secret information, starting with the topmost element 10f and proceeding downward to the lower layers. The area determiner 103a then determines whether each of the elements is superimposed by the masking area 50 the user specifies for information secrecy.

If it is determined that an element is superimposed by the masking area 50 the user specifies for information secrecy, the masking unit 104a masks the superimposition area of the element with the masking area 50. The masking process is also performed on an area of the element superimposed by another element.

The element 10a, the element 10b, the element 10d, and the element 10f are thus masked, thereby becoming an element 30a, an element 30b, an element 30d, and an element 30f, respectively. The element 30a, the element 30b, the element 10c, the element 30d, the element 10e, and the element 30f are thus collectively referred to as a processed element group 30.

After masking the top side of all the elements having an area superimposed by another element and partially or entirely superimposed by the masking area 50, the processed element group 30 is arranged at the same location as in the original document. The processed document is thus produced.

The secrecy of the secret information is maintained even if a user having received the processed document edits the received document and modifies the processed element group 30 in which the secret information is hidden with one object superimposed by another.

The document masking apparatus 100b of the second embodiment of the present invention is identical in structure to and different in process from the document masking apparatus 100a of the first embodiment. The structure of the document masking apparatus 100b is thus not shown. The document masking apparatus 100b includes an element extractor 101b, an area determiner unit 103b, and a masking unit 104b. The rest of the document masking apparatus 100b is identical to the document masking apparatus 100a of the first embodiment of the present invention.

The document masking process of the document masking apparatus 100b of the second embodiment of the present invention is described below. FIG. 6 is a flowchart illustrating the document masking process in accordance with the second embodiment of the present invention. Referring to FIG. 6, in S201, the document display controller 107 reads a document to be mask processed from the documents stored on the document file storage unit 106, and causes the read document to be displayed on the display screen of the output device 200b.

In S202, the area specifier 102 specifies, as the document to be mask processed, the masking area input by the user with the input device 200a. In S203, the element extractor 101b determines whether an element of the document to be mask processed is extracted starting with the topmost layer in accordance with the order illustrated in FIG. 3.

If the element extractor 101b determines that the element of the document to be mask processed is extracted starting with the topmost layer in accordance with the order (YES in S203), processing proceeds to S204. If the element extractor 101b determines that the element of the document to be mask processed is not extracted in accordance with the order (NO in S203), processing proceeds to S210.

In S204, the area determiner 103b determines whether an area of the element extracted in S203 is superimposed by the masking area specified in S202.

If the area determiner 103b determines that the area of the element extracted in S203 is superimposed by the masking area specified in S202 (YES in S204), processing proceeds to S205. If the area determiner 103b determines that the area of the element extracted in S203 is not superimposed by the masking area specified in S202 (NO in S204), processing proceeds to S209.

In S205, the area determiner 103b determines whether a character is included in the area of the element extracted in S203 determined to be superimposed by the masking area specified in S202.

If the area determiner 103b determines in S205 that a character is included in the area of the element extracted in S203 determined to be superimposed by the masking area specified in S202 (YES in S205), processing proceeds to S206. If the area determiner 103b determines in S105 that a character is not included in the area of the element extracted in S203 determined to be superimposed by the masking area specified in S202 (NO in S205), processing proceeds to S207.

In S206, the masking unit 104b converts, into different information (such as a different character, a different symbol or the like), the character included in the area of the element extracted in S203 determined to be superimposed by the masking area specified in S202. Processing then proceeds to S207.

In S207, the area determiner 103b determines whether an image is included in the area of the element extracted in S203 determined to be superimposed by the masking area specified in S202.

If the area determiner 103b determines that an image is included in the area of the element extracted in S203 determined to be superimposed by the masking area specified in S202 (YES in S207), processing proceeds to S208. If the area determiner 103b determines that an image is not included in the area of the element extracted in S203 determined to be superimposed by the masking area specified in S202 (NO in S207), processing proceeds to S209.

In S208, the masking unit 104b fills in the image included in the area of the element determined to be superimposed by the masking area specified in S202, by converting the image into different information (such as a different image). Processing returns to S209.

In S209, the masking unit 104b sets up a new masking area by adding the areas of all the elements extracted in S203 to the masking area specified in S202. Processing then returns to S203 and then subsequent s are performed on the new masking area.

In S210, the document generator 105 rearranges all the elements in the original locations, and generates the processed document. The document masking process thus ends.

In the document masking process of the second embodiment of the present invention, an area hidden by another object may be masked even if the user does not specify any particular masking area.

The secrecy of the secret information is thus maintained even if a user having received the processed document edits the received document and modifies the processed element group 30 in which the secret information is hidden with one object superimposed by another.

If the masking process is performed automatically or in response to a button operation of the user, an inadvertent leak of the secret information is reduced or prevented when the electronic document is distributed.

One embodiment of the present invention reliably masks a secret portion of the electronic data document produced by combining objects, namely, not only secret information included in the user specified area, but also secret information hidden by a superimposing object. Both reusability and information secrecy of the masked electronic data document distributed are thus assured.

The present invention is not limited to the above-described embodiments. A variety of changes and modifications are possible without departing from the scope of the present invention. The advantages of the present invention are not limited to those described above.

Some or all the process described above as being automatically performed may be partly or entirely performed in a manual fashion. Some or all the process described above as being manually performed may be partly or entirely performed in an automatic fashion. Information including the process, control procedure, specific name, and a variety of data and parameters may be modified unless otherwise particularly stated.

The illustrated components of the apparatus represent functional concepts only and are not necessarily physically constructed as illustrated. Specific distribution and integration configurations of the components of the apparatus are not limited to the configurations illustrated. A part or the whole of the components may be functionally or physically distributed or integrated by any unit depending on workload and usage of each component.

Each of the above-described processes performed by the apparatus may be partially or entirely performed by a central processing unit (CPU) (such as a microprocessing unit (MPU), or a micro controller unit (MCU)), or by a program executed by the CPU. The process may also be executed using wired logic or hardware.

What is claimed is:

1. A non-transitory computer-readable recording medium storing a document editing program for causing a computer to edit an electronic document including a plurality of hierarchically arranged objects, the program making a computer execute:

extracting an object from the electronic document including the plurality of hierarchically arranged objects representing one of a text, an image, a drawing and a table;

determining whether the extracted object is superimposed by a user specified area serving as a masking area of a target document input by a user; and converting, into different information, information included in an area of the object determined to be superimposed by the user specified area.

2. The non-transitory computer-readable recording medium storing a document editing program according to claim 1, wherein the converting converts one of the text, the image, the drawing, and the table as the object determined to be superimposed by the user specified area into one of a different text, a different image, a different drawing, and a different table, respectively.

3. The non-transitory computer-readable recording medium storing a document editing program according to claim 1, the program making the computer further execute creating, after converting, into the different information, the information included in an area of each of the objects determined to be superimposed by the user specified area, a processed electronic document by combining the converted information into the same layout as the object prior to being extracted.

4. The non-transitory computer-readable recording medium storing a document editing program according to claim 1, wherein the determining determines a superimposition area of the extracted object and an object hierarchically higher than the extracted object; and
   wherein the converting comprises converting information included in the superimposition area of the extracted object into the different information.

5. The non-transitory computer-readable recording medium storing a document editing program according to claim 3, wherein the converting converts information included in the area of the extracted object superimposed by the user specified area and information included in the superimposition area of the extracted object, into the different information.

6. The non-transitory computer-readable recording medium storing a document editing program according to claim 4, wherein the determining determines the superimposition area of the extracted object and the object hierarchically higher than the extracted object, regardless of the presence or absence of the user specified area.

7. The non-transitory computer-readable recording medium storing a document editing program according to claim 1, wherein the converting displays the converted part of the information included in the area of the object determined to be superimposed by the user specified area in an identifiable fashion.

8. A document editing apparatus for editing an electronic document including a plurality of hierarchically arranged objects, comprising:
   a storage to store an original electronic document including the hierarchically arranged objects representing one of a text, an image, a drawing, and a table; and
   a processor, the processor configured to:
      extract an object to be masked in an area specified by a user from the original electronic document stored in the storage;
      determine whether the extracted object is superimposed by the user specified area serving as a masking area of a target document input by a user;
      convert, into different information, information included in an area of the object determined to be superimposed by the user specified area to generate a processed electronic document; and
      store the processed electronic document in the storage.

9. The document editing apparatus according to claim 8, wherein the processor is further configured to convert one of the text, the image, the drawing, and the table as the object determined to be superimposed by the user specified area into one of a different text, a different image, a different drawing, and a different table, respectively.

10. The document editing apparatus according to claim 9, wherein the processor is further configured to create the processed electronic document by combining the converted information with the extracted object.

11. The document editing apparatus according to claim 8, wherein the processor is further configured to:
   determine a superimposition area of the extracted object and an object hierarchically higher than the extracted object; and
   convert information included in the superimposition area of the extracted object into the different information.

12. The document editing apparatus according to claim 11, wherein the processor is further configured to convert, into the different information, information included in the area of the extracted object and superimposed by the user specified area and information included in the superimposition area of the extracted object.

13. The document editing apparatus according to claim 11, wherein the processor is further configured to determine the superimposition area of the extracted object and the object hierarchically higher than the extracted object, regardless of the presence or absence of the user specified area.

14. The document editing apparatus according to claim 8, wherein the processor is further configured to display, in an identifiable fashion, a converted part of the information included in the area of the object determined to be superimposed by the user specified area.

15. A document editing method executed by a document editing apparatus for editing an electronic document including a plurality of hierarchically arranged objects, the document editing apparatus including a storage and a processor, the document editing method comprising:
   extracting an object from an original electronic document stored in the storage, the original electronic document including the hierarchically arranged objects representing one of a text, an image, a drawing, and a table;
   determining, by the processor, whether the extracted object is superimposed by a user specified area serving as a masking area of a target document input by a user;
   converting, into different information, information included in an area of the object determined to be superimposed by the user specified area to generate a processed electronic document; and
   storing the processed electronic document in the storage.

16. The document editing method according to claim 15, wherein the processor converts one of the text, the image, the drawing, and the table as the object determined to be superimposed by the user specified area into one of a different text, a different image, a different drawing, and a different table, respectively.

17. The document editing method according to claim 15, wherein the processor creates the processed electronic document by combining the converted information determined to be superimposed by the user specified area with the object prior to being extracted.

18. The document editing method according to claim 15, wherein the processor determines a superimposition area of the extracted object and an object hierarchically higher than the extracted object; and wherein the processor converts information included in the superimposition area of the extracted object into the different information.

19. The document editing method according to claim 15, wherein the processor displays, in an identifiable fashion, a converted part of the information included in the area of the object determined to be superimposed by the user specified area.

* * * * *

UNITED STATES PATENT AND TRADEMARK OFFICE
CERTIFICATE OF CORRECTION

| | |
|---|---|
| PATENT NO. | : 8,233,193 B2 |
| APPLICATION NO. | : 12/414594 |
| DATED | : July 31, 2012 |
| INVENTOR(S) | : Shuichi Shiitani et al. |

It is certified that error appears in the above-identified patent and that said Letters Patent is hereby corrected as shown below:

On the Title page, Item (54) and Column 1, lines 1-4, the TITLE should read:

-- DOCUMENT EDITING APPARATUS AND METHOD FOR EDITING DOCUMENT INCLUDING HIERARCHICALLY ARRANGED OBJECTS --.

Signed and Sealed this
Second Day of October, 2012

David J. Kappos
*Director of the United States Patent and Trademark Office*